Figure 1:
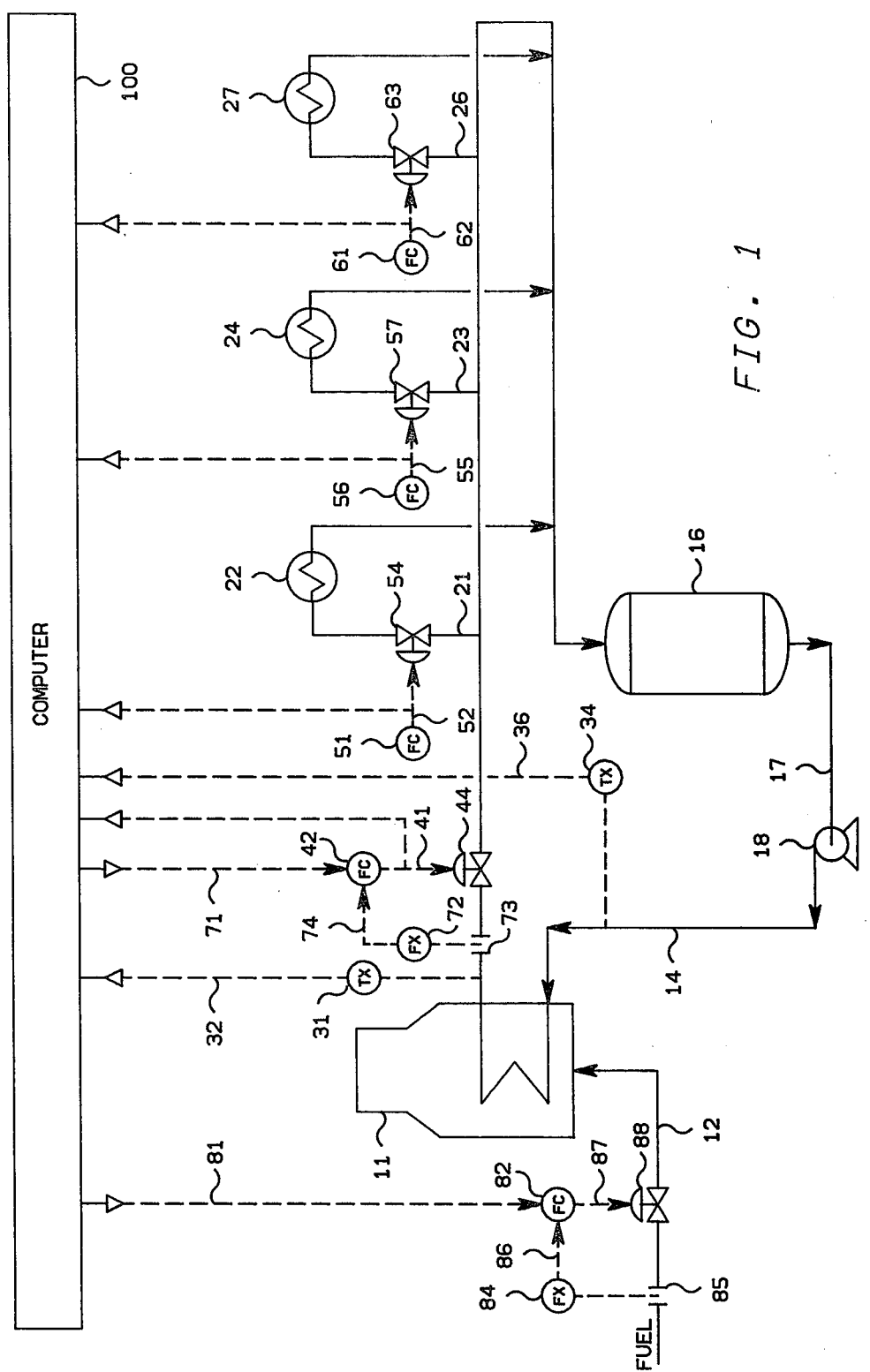

United States Patent [19]

Stewart

[11] 4,434,746

[45] Mar. 6, 1984

[54] CONTROL OF A SYSTEM FOR SUPPLYING HEAT

[75] Inventor: William S. Stewart, Bartlesville, Okla.

[73] Assignee: Phillips Petroleum Company, Bartlesville, Okla.

[21] Appl. No.: 472,398

[22] Filed: Mar. 4, 1983

[51] Int. Cl.³ .............................................. F22B 37/42
[52] U.S. Cl. .................................. 122/448 R; 165/12; 237/8 R
[58] Field of Search ................... 122/448 R; 237/8 R, 237/2 A, 2 R; 236/15 BF; 165/12, 13

[56] References Cited

U.S. PATENT DOCUMENTS

| 3,140,048 | 7/1964 | Saunders | 237/8 R |
| 3,933,197 | 1/1976 | Zimmer et al. | 165/2 |
| 4,150,788 | 4/1979 | Matsumoto et al. | 237/8 R |
| 4,192,455 | 3/1980 | Rasmussen et al. | 237/8 R |
| 4,257,556 | 3/1981 | Skala | 237/7 |

Primary Examiner—Albert J. Makay
Assistant Examiner—David Helmbold

[57] ABSTRACT

In a process in which a heating fluid supplied from a heater is utilized to supply heat to a plurality of processes, method and apparatus is provided for substantially optimizing the operation of the heater by minimizing the temperature of the fluid flowing from the heater while continuing to satisfy the heat demand of the processes being served.

16 Claims, 2 Drawing Figures

CONTROL OF A SYSTEM FOR SUPPLYING HEAT

This invention relates to process control. In one aspect, this invention relates to method and apparatus for controlling a system for supplying heat to a plurality of processes.

In many manufacturing processes, a furnace is utilized to heat a fluid stream and the thus heated fluid stream is utilized to supply heat to a plurality of processes. An example of such a system is a natural gas liquefaction process in which hot oil or some other fluid is heated and utilized to supply heat to the reboiler associated with the debutanizer, depropanizer and deethanizer.

Substantial energy savings can be achieved in such a heating system by minimizing the temperature of the effluent withdrawn from the heater. Such a minimization results in less heat loss, reduced coking problems in the heater and a larger $\Delta t$ for heat transfer from the combustion zone in the heater to the heating fluid.

While minimization of the effluent temperature results in significant economic savings, such economic savings cannot be achieved at the expense of not having sufficient heat available during process upsets or at the expense of significantly disturbing the various processes to which heat is supplied from the common source. It is thus an object of this invention to substantially optimize the performance of a heating system by substantially minimizing the temperature of the heating fluid withdrawn from the heater while still maintaining a sufficient heat flow to each process served by the heating fluid even during periods of process upsets and not causing disturbance in the various processes served by the heating system.

In accordance with the present invention, method and apparatus is provided whereby the temperature of the heating fluid removed from the heater is formed to decrease by decreasing the flow rate of fuel to the heater. However, at the same time, the flow rate of the effluent withdrawn from the heater is increased to satisfy the heat demand of the processes being served. The valves which control the flow of the heating fluid to the individual processes will begin to open to satisfy the heat demand of the processes by increasing the flow rate of the heating fluid as the temperature drops. At some point, a maximum desired open position will be reached for at least one of the valves controlling the flow of the heating fluid to the process or for the valve which controls the flow rate of the heating fluid withdrawn from the heater. At this point, the temperature of the effluent is forced to stabilize which prevents such valve from having to open further. Thus, the temperature of the heating fluid is set at the temperature which will result in at least one valve being in a maximum allowed open position, or at a low limit for the temperature of the heating fluid which results in a substantial optimization of the heating system while still maintaining a sufficient heat flow to satisfy the demands of the processes being served. This results in significant economic benefits for the overall process.

Figure 2:
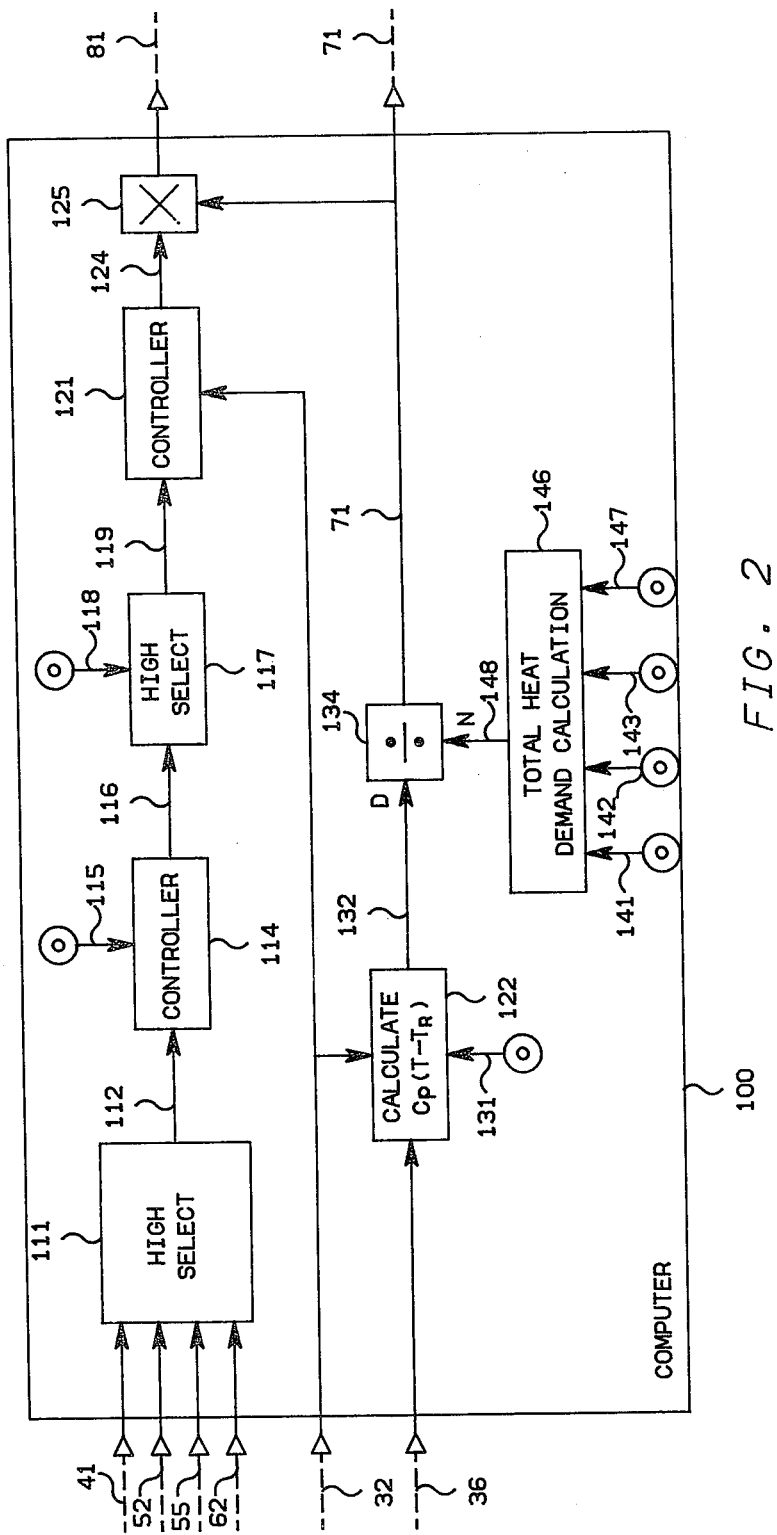

Other objects and advantages of the invention will be apparent from the foregoing brief description of the invention and the claims as well as the detailed description of the drawings which are briefly described as follows:

FIG. 1 is a diagrammatic illustration of a heating system serving three reboilers and the associated control system of the present invention; and FIG. 2 is a diagram of the computer logic utilized to derive the control signals illustrated in FIG. 1 based on the process measurements illustrated in FIG. 1.

The invention is illustrated and described in terms of a specific heating system in which hot oil is utilized as the heating fluid and the process served is a natural gas liquefaction process. The specific parts of the natural gas liquefaction process illustrated are the reboilers associated with the debutanizer, depropanizer and deethanizer. However, the invention is applicable to different heating fluids such as steam and is also applicable to serving many different processes.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate are compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawings and in particular to FIG. 1, there is illustrated a furnace 11 to which fuel is supplied through coduit means 12. Hot oil is circulated to the furnace 11 through conduit means 14 which is generally referred to as the hot oil header. Hot oil flowing through the hot oil header 14 eventually is provided to the surge tank 16. Hot oil is removed from the surge tank 16 through conduit means 17 and is pumped by pump 18 to the hot oil header 14. This cycle is continued so long as heat is required by the processes being served.

Hot oil is removed from the hot oil header 14 through conduit means 21 and is used to supply heat to the reboiler 22 associated with a debutanizer in a natural gas liquefaction process. After passing through the reboiler 22, the hot oil is returned to the hot oil header 14. In like manner, hot oil is withdrawn from the hot oil header 14 through conduit means 23 and is utilized to supply heat to the reboiler 24 associated with a depropanizer and hot oil is withdrawn from the hot oil header 14 through conduit means 26 and is utilized to supply heat to the reboiler 27 associated with a deethanizer.

In accordance with the present invention, a number of process measurements are utilized to derive the control signals which will be described hereinafter for controlling the hot oil system. These process measurements are as follows.

Temperature transducer 31 in combination with a temperature measuring device such as a thermocouple, which is operably located on the effluent side of the furnace 11, provides an output signal 32 which is representative of the temperature of the hot oil effluent withdrawn from the furnace 11. Signal 32 is provided from the temperature transducer 31 as an input to computer 100.

In like manner, temperature transducer 34 in combination with a temperature measuring device such as a thermocouple, which is operably located on the feed side of the furnace 11, provides an output signal 36 which is representative of the temperature of the hot oil provided as a feed to the furnace 11. Signal 36 is provided from temperature transducer 34 as an input to computer 100.

As will be more fully described hereinafter, signal 41, which is provided from the flow controller 42 as a control signal to the control valve 44, which is operably located in the hot oil header 14, is representative of the position of the control valve 44 required to provide a hot oil flow rate which will satisfy the heat demand of the debutanizer, depropanizer and deethanizer plus some desired reserve heat. The control valve 44 is manipulated in response to signal 41, the magnitude of signal 41 is considered the actual position of the control valve 44 even though the magnitude of signal 41 and the actual position of control valve 44 may not be exactly the same during period of change. In addition to being provided to the control valve 44, signal 41 is also provided from the flow controller 42 as an input to computer 100.

The flow rate of the heating fluid through conduit means 21 to the debutanizer reboiler 22 is manipulated by the debutanizer control system. Many conventional control systems are known. Typically, the flow controller 51 would be provided with a set point signal representative of the flow rate of the hot oil through conduit means 21 required to maintain a desired product composition or other desired process variable. This set point signal would be compared to the actual flow rate of the hot oil flowing through conduit means 21 and the flow controller 51 would provide an output signal 52 which is representative of the position of the control valve 54, which is operably located in conduit means 21, required to maintain the actual flow rate of the hot oil substantially equal to the flow rate represented by the set point. Since the control valve 54 is manipulated in response to signal 52, signal 52 is considered to be representative of the actual position of the control valve 54. In addition to being provided to the control valve 54, signal 52 is also provided as an input to computer 100.

The flow rate of heat to the depropanizer reboiler 24 and deethanizer reboiler 27 is manipulated in the same manner as previously described for the debutanizer reboiler 22 by output signals 55 and 62, respectively, from the flow controllers 56 and 61. Signal 55 is considered to be representative of the actual position of the control valve 57 which is operably located in conduit means 23. Signal 62 is considered to be representative of the actual position of the control valve 63 which is operably located in conduit means 26. Signals 55 and 62 are also supplied to computer 100.

In response to the described input signals, computer 100 provides two control signals as will be more fully described hereinafter. Signal 71 is representative of the flow rate of the hot oil required to satisfy the present heat demand of the debutanizer, depropanizer and deethanizer as well as provide a desired amount of heat reserve. Signal 71 is provided from computer 100 as a set point input to the flow controller 42.

Flow transducer 72 in combination with the flow sensor 73, which is operably located in the hot oil header 14, provides an output signal 74 which is representative of the actual flow rate of the hot oil through the header 14. Signal 74 is provided from the flow transducer 72 as the process variable input to the flow controller 42. In response to signals 71 and 74, the flow controller 42 provides an output signal 41 which is scaled so as to be representative of the position of the control valve 44 required to maintain the actual flow rate of the hot oil substantially equal to the desired flow rate represented by signal 71. Signal 41 is utilized as has been previously described.

Computer 100 also provides an output signal 81 which is representative of the flow rate of the fuel flowing through conduit means 12 required to maintain a desired temperature of the hot oil withdrawn from the furnace 11. Essentially, this desired temperature will be a temperature which will prevent any of valves 44, 54, 57 and 63 from being opened beyond a maximum desired open position or will be equal to a low limit for the hot oil temperature. Signal 81 is providef from computer 100 as the set point signal for flow controller 82.

Flow transducer 84 in combination with the flow sensor 85, which is operably located in conduit means 12, provides an output signal 86 which is representative of the actual flow rate of the fuel flowing through conduit means 12. Signal 86 is provided as the process variable input to the flow controlller 82. In response to signals 81 and 86, the flow controller 82 provides an output signal 87 which is responsive to the difference between signals 81 and 86. Signal 87 is scaled so as to be representative of the position of the control valve 88, which is operably located in conduit means 12, required to maintain the actual flow rate of the fuel through conduit means 12 substantially equal to the flow rate represented by signal 81. Signal 87 is provided from the flow controller 82 as the control signal for the control valve 88 and control valve 88 is manipulated in response thereto.

The logic flow diagram utilized to calculated the control signals 71 and 81, in response to the previously described input signals to computer 100, is illustrated in FIG. 2. Referring now to FIG. 2, signals 41, 52, 55 and 62, which are considered to be representative of the actual positions of control valves 44, 54, 57 and 63 respectively are provided as inputs to the high select block 111. Signal 112, which is provided from the high select block 111 as the process variable input to the controller block 114, will be one of the signals 41, 52, 55 and 62 which is representative of the highest valve opening.

Signal 115, which is representative of the maximum allowed open position for valves 44, 54, 57 and 63 is provided as the set point input to the controller block 114. Signal 115 will typically have a value in the range of about 80 to about 90 percent open.

In response to signals 112 and 115, the controller block 114 provides an output signal 116 which is responsive to the difference between signals 112 and 115. Signal 116 is scaled so as to be representative of the temperature of the hot oil flowing from the furnace 11 required to maintain at least one of the valves 44, 45, 57, and 63 at the maximum allowed open position represented by signal 115. Signal 116 is provided from the controller block 114 as an input to the high select block 117.

The high select block 117 is also provided with signal 118 which is representative of a low temperature limit for the hot oil flowing from the furnace 11. The magnitude of signal 118 will typically be determined by metallurgical or other process considerations. The high select block 117 establishes signal 119 which is equal to the one of signals 116 and 118 which is representative of the higher temperature. Signal 119 is provided from the high select block 117 as the set point input to the controller block 121. Use of the low temperature limit is not required but is preferred.

Signal 32, which is representative of the temperature of the hot oil withdrawn from the furnace 11, is provided as the process variable input to the controller block 121 and is also provided as an input to the calculate $C_P(T-T_R)$ block 122. In response to signals 119 and 32, the controller block 121 provides an output signal 124 which is responsive to the difference between signals 32 and 119. Signal 124 is scaled so as to be representative of the ratio of the fuel flow rate to the hot oil flow rate required to maintain the actual temperature of the hot oil withdrawn from the furnace 11 substantially equal to the desired temperature represented by signal 119. Signal 124 is provided from the controller block 121 as an input to the multiplying block 125.

The heat actually supplied by the hot oil is given by Equation 1:

$$Q = F\,C_P(T-T_4)$$

where $Q$ = the heat supplied by the hot oil;
$F$ = flow rate of the hot oil through the hot oil header 14;
$C_P$ = the specific heat of the hot oil (btu/lb °F.);
$T$ = the temperature of the hot oil flowing from the furnace 11 (signal 32); and
$T_R$ = the temperature of the hot oil feed to the furnace 11 (signal 36).

Equation 1 is utilized to calculate the flow rate of the hot oil required to satisfy the heat demand of the debutanizer, depropanizer and deethanizer as well as provide a reserve amount of heat.

To initiate the calculation, the term $C_P(T-T_R)$ is first calculated in block 122. In addition to signal 32, which is representative of $T$, signal 36, which is representative of $T_R$ and signal 131, which is representative of $C_P$, are supplied to the block 122. In general, $C_P$ will be known from the characteristics of the particular oil being utilized. Signal 132, which is representative of the value of $C_P(T-T_R)$, is provided from block 122 as the denominator input to the dividing block 134.

The total heat required by a debutanizer, depropanizer or deethanizer can be calculated by a number of conventional methods. Since such methods are known and play no part in the description of the present invention, the details of such calculations are not provided herein. An illustration of the calculation of heat required by a fractional distillation column may be found in U.S. Pat. No. 4,166,770.

Signals 141, 142 and 143 are representative of the heat required by the debutanizer, depropanizer and deethanizer respectively. These signals would typically be provided from the supervisory control computer for these columns but could be input by a operator based on operating experience. Signals 141, 142 and 143 are provided as inputs to the total heat demand calculation block 146.

Signal 147 is representative of the desired reserve heat. Signal 147 could be set equal to zero but, from a practical standpoint, some reserve heat is necessary to satisfy process upsets. Signal 147 is also provided to the total heat demand calculation block 146. Signals 141, 142, 143 and 147 are summed in the total heat demand calculation block 146 to establish signal 148 which is representative of the total heat required by the processes being serviced by the hot oil system as well as the required reserve heat. Signal 148 is provided from the total heat demand calculation block 146 as the numerator input to the dividing block 134.

Signal 148, which is representative of Q in Equation 1, is divided by signal 132 in the dividing block 134. The result is signal 71 which is representative of F in Equation 1 (the flow rate of the hot oil required to provide the heat represented by signal 148). Signal 71 is provided as an output signal from computer 100 and is utilized as has been previously described. Signal 71 is also supplied to the multiplying block 125.

Signal 124 is multiplied by signal 71 to establish signal 81 which is representative of the flow rate of the fuel through conduit means 12 required to maintain the temperature represented by signal 119. Signal 81 is provided as an output from computer 100 and is utilized as has been previously described.

In summary, the control system will reduce the hot oil temperature while still maintaining an adequate supply of heat to the process being served until such time as a low limit on the temperature is reached, or a control valve reaches a maximum desired open position. This results in a substantial optimization of the operation of the hot oil system while still maintaining an adequate supply of heat to the processes served.

The invention has been described in terms of a preferred embodiment as illustrated in FIG. 1. Specific components which can be used in the practice of the invention as illustrated in FIG. 1 such as flow sensors 73 and 85; flow transducers 72 and 84; flow controllers 42, 51, 56, 61 and 82; temperature transducers 31 and 34; and control valves 44, 54, 57, 63 and 88 are each well known, commercially available control components such as are described at length in Perry's *Chemical Engineers' Handbook*, 4th Edition, Chapter 22, McGraw-Hill.

The additional towers and equipment which would have been associated with a debutanizer, depropanizer and deethanizer as well as additional pumps, heat exchangers, additional controller components, etc. which might be associated with a hot oil system have not been illustrated since these additional components play no part in the description of the present invention.

While the invention has been described in terms of the presently preferred embodiment, reasonable variations and modifications are possible by those skilled in the art and such modifications and variations are within the scope of the described invention and the appended claims.

That which is claimed is:
1. Apparatus comprising:
a heater;
means for passing a fluid stream through said heater;
means for supplying a fuel to said heater, wherein the combustion of said fuel in a combustion zone in said heater supplies heat to said fluid stream;
a first control valve operably located so as to manipulate the total flow of the effluent stream from said heater;
a second control valve operably located so as to manipulate the flow of a first portion of said effluent stream to a first process, wherein said first portion of said effluent stream flowing through said second control valve supplies heat to said first process;
a third control valve operably located so as to manipulate the flow of a second portion of said effluent stream to a second process, wherein said second portion of said effluent stream flowing through said third control valve supplies heat to said second process;
means for establishing a first signal representative of the position of said first control valve;
means for establishing a second signal representative of the position of said second control valve;
means for establishing a third signal representative of the position of said third control valve;
a first high select means;
means for providing said first signal, said second signal and said third signal to said first high select means, wherein said first high select means establishes a fourth signal representative of the one of said first, second and third signals which is representative of the most open valve position;
means for establishing a fifth signal representative of the maximum desired open position for any one of said first, second and third control valves;
means for comparing said fourth signal and said fifth signal and for establishing a sixth signal which is responsive to the difference between said fourth signal and said fifth signal;
means for establishing a seventh signal, representative of the flow rate of said fuel required to maintain the position of at least one of said first, second and third control valves substantially equal to the maximum desired valve opening represented by said fifth signal, in response to said sixth signal;
means for manipulating the flow rate of said fuel to said heater in response to said seventh signal;
means for establishing an eighth signal representative of the total heat required by said first and second processes plus any desired reserve heat;
means for establishing a ninth signal, representative of the flow rate of said effluent stream through said first control valve required to provide the total heat represented by said eighth signal, in response to said eighth signal; and
means for manipulating said first control valve in response to said ninth signal.

2. Apparatus in accordance with claim 1 wherein said sixth signal is scaled so as to be representative of the temperature of said effluent stream required to maintain the position of at least one of said first, second and third control valves substantially equal to the maximum desired open position represented by said fifth signal and wherein said means for establishing said seventh signal in response to said sixth signal comrises:

means for establishing a tenth signal representative of the actual temperature of said effluent stream (T);

means for comparing said sixth signal and said tenth signal and for establishing an eleventh signal which is responsive to the difference between said sixth signal and said tenth signal, wherein said eleventh signal is scaled so as to be representative of the ratio of the flow rate of said fuel to the flow rate of said effluent stream required to maintain the temperature represented by said sixth signal; and means for multiplying said eleventh signal by said ninth signal to establish said seventh signal.

3. Apparatus in accordance with claim 1 wherein said sixth signal is scaled so as to be representative of the temperature of said effluent stream required to maintain the position of at least one of said first, second and third control valves substantially equal to the maximum desired open position represented by said fifth signal and wherein said means for establishing said seventh signal in response to said sixth signal comprises:

means for establishing a tenth signal representative of a low limit for said effluent temperature;

a second high select means;

means for providing said sixth signal and said tenth signal to said second high select means, wherein said second high select means establishes an eleventh signal representative of the higher of said sixth and tenth signals;

means for establishing a twelfth signal representative of the actual temperature of said effluent stream;

means for comparing said eleventh signal and said twelfth signal and for establishing a thirteenth signal which is responsive to the difference between said eleventh signal and said twelfth signal, wherein said thirteenth signal is scaled so as to be representative of the ratio of the flow rate of said fuel to the flow rate of said effluent stream required to maintain the temperature represented by said eleventh signal; and means for multiplying said thirteenth signal by said ninth signal to establish said seventh signal.

4. Apparatus in accordance with claim 2 wherein said means for establishing said ninth signal in response to said eighth signal comprises:

means for establishing a twelfth signal representative of the temperature of said fluid stream flowing to said heater ($T_R$);

means for establishing a thirteenth signal representative of the specific heat of said effluent stream ($C_P$);

means for establishing a fourteenth signal, representative of $C_P(T-T_R)$ in response to said tenth, twelfth and thirteenth signals; and means for dividing said eighth signal by said fourteenth signal to establish said ninth signal.

5. Apparatus in accordance with claim 4 additionally comprising:

a fourth control valve for manipulating the flow of a third portion of said effluent stream to a third process, wherein said third portion of said effluent stream supplies heat to said third process; and means for establishing a fifteenth signal representative of the position of said fourth control valve, wherein said fifteenth signal is supplied to said first high select means and wherein said fourth signal is representative of the highest of said first, second, third and fifteenth signals.

6. Apparatus in accordance with claim 5 wherein said first process is a debutanizer, said second process is a depropanizer, and said third process is a deethanizer and wherein said fluid stream is oil.

7. Apparatus in accordance with claim 5 wherein said means for manipulating the flow rate of said fuel in response to said seventh signal comprises:

a fifth control valve operably located so as to manipulate the flow of said fuel;

means for establishing a sixteenth signal representative of the actual flow rate of said fuel;

means for comparing said seventh signal and said sixteenth signal and for establishing a seventeenth signal which is responsive to the difference between said seventh signal and said sixteenth signal, wherein said seventeenth signal is scaled so as to be representative of the position of said fifth control valve required to maintain the actual flow rate of said fuel substantially equal to the desired flow rate represented by said seventh signal; and means for manipulating said fifth control valve in response to said seventeenth signal.

8. Apparatus in accordance with claim 7 wherein said means for manipulating the flow rate of said effluent stream in response to said ninth signal comprises:

means for establishing an eighteenth signal representative of the actual flow rate of said effluent stream;

means for comparing said ninth signal and said eighteenth signal and for establishing a nineteenth signal which is responsive to the difference between said ninth signal and said eighteenth signal, wherein said nineteenth signal is scaled so as to be representative of the position of said first control valve required to maintain the actual flow rate of said effluent stream substantially equal to the desired flow rate represented by said ninth signal; and means for manipulating said first control valve in response to said nineteenth signal.

9. A method for controlling a system for supplying heat to a plurality of processes, wherein fuel is supplied to a heater with the combustion of said fuel in a combustion zone in said heater supplying heat to a fluid stream passing through said heater, wherein the effluent stream from said heater is passed through a first control valve operably located so as to manipulate the total flow of said effluent stream, wherein a first portion of said effluent stream is utilized to supply heat to a first process by passing said first portion of said effluent stream through a second control valve which is operably located so as to manipulate the flow of said first portion of said effluent stream to said first process, and wherein a second portion of said effluent stream is utilized to supply heat to a second process by passing said second portion of said effluent stream through a third control valve which is operably located so as to manipulate the flow of said second portion of said effluent stream to said second process, said method comprising the steps of:

establishing a first signal representative of the position of said first control valve;

establishing a second signal representative of the position of said second control valve;

establishing a third signal representative of the position of said third control valve;

establishing a fourth signal representative of the one of said first, second and third signals which is representative of the most open valve position;

establishing a fifth signal representative of the maximum desired open valve position for any one of said first, second and third control valves;

comparing said fourth signal and said fifth signal and establishing a sixth signal which is responsive to the difference between said fourth signal and said fifth signal;

establishing a seventh signal, representative of the flow rate of said fuel required to maintain the position of at least one of said first, second and third control valves substantially equal to the maximum desired valve opening represented by said fifth signal, in response to said sixth signal;

manipulating the flow rate of said fuel to said heater in response to said seventh signal;

establishing an eighth signal representative of the total heat required by said first and second processes plus any desired reserve heat;

establishing a ninth signal, representative of the flow rate of said effluent stream through said first control valve required to provide the total heat represented by said eighth signal, in response to said eighth signal; and manipulating said first control valve in response to said ninth signal.

10. A method in accordance with claim 9 wherein said sixth signal is scaled so as to be representative of the temperature of said effluent stream required to maintain the position of at least one of said first, second and third control valves substantially equal to the maximum desired open position represented by said fifth signal and wherein said step of establishing said seventh signal in response to said sixth signal comprises:

establishing a tenth signal representative of the actual temperature of said effluent stream (T);

comparing said sixth signal and said tenth signal and establishing an eleventh signal which is responsive to the difference between said sixth signal and said tenth signal, wherein said eleventh signal is scaled so as to be representative of the ratio of the flow rate of said fuel to the flow rate of said effluent stream required to maintain the temperature represented by said sixth signal; and multiplying said eleventh signal by said ninth signal to establish said seventh signal.

11. A method in accordance with claim 9 wherein said sixth signal is scaled so as to be representative of the temperature of said effluent stream required to maintain the position of at least one of said first, second and third control valves substantially equal to the maximum desired open position represented by said fifth signal and wherein said step of establishing said seventh signal in response to said sixth signal comprises:

establishing a tenth signal representative of a low limit for said effluent temperature;

establishing an eleventh signal representative of the higher of said sixth and tenth signals;

establishing a twelfth signal representative of the actual temperature of said effluent stream;

comparing said eleventh signal and said twelfth signal and establishing a thirteenth signal which is responsive to the difference between said eleventh signal and said twelfth signal, wherein said thirteenth signal is scaled so as to be representative of the ratio of the flow rate of said fuel to the flow rate of said effluent stream required to maintain the temperature represented by said eleventh signal; and multiplying said thirteenth signal by said ninth signal to establish said seventh signal.

12. A method in accordance with claim 10 wherein said step of establishing said ninth signal in response to said eighth signal comprises:

establishing a twelfth signal representative of the temperature of said fluid stream flowing to said heater ($T_R$);

establishing a thirteenth signal representative of the specific heat of said effluent stream ($C_P$);

establishing a fourteenth signal, representative of $C_P(T-T_R)$, in response to said tenth, twelfth and thirteenth signals; and dividing said eighth signal by said fourteenth signal to establish said ninth signal.

13. A method in accordance with claim 12 wherein a third portion of said effluent stream is utilized to supply heat to a third process by passing said third portion of said effluent stream through a fourth control valve which is operably located so as to manipulate the flow of said third portion of said effluent stream to said third process, said method additionally comprising the step of establishing a fifteenth signal representative of the position of said fourth control valve, wherein said fourth signal is representative of the highest of said first, second, third and fifteenth signals.

14. A method in accordance with claim 13 wherein said first process is a debutanizer, said second process is a depropanizer, and said third process is a deethanizer and wherein said fluid stream is oil.

15. A method in accordance with claim 13 wherein said step of manipulating the flow rate of said fuel in response to said seventh signal comprises:

establishing a sixteenth signal representative of the actual flow rate of said fuel;

comparing said seventh signal and said sixteenth signal and establishing a seventeenth signal which is responsive to the difference between said seventh signal and said sixteenth signal, wherein said seventeenth signal is scaled so as to be representative of the position of a fifth control valve, which is operably located so as to manipulate the flow of said fuel, required to maintain the actual flow rate of said fuel substantially equal to the desired flow rate represented by said seventh signal; and manipulating said fifth control valve in response to said seventeenth signal.

16. A method in accordance with claim 15 wherein said step of manipulating the flow rate of said effluent stream in response to said ninth signal comprises:

establishing an eighteenth signal representative of the actual flow rate of said effluent stream;

comparing said ninth signal and said eighteenth signal and establishing a nineteenth signal which is responsive to the difference between said ninth signal and said eighteenth signal, wherein said nineteenth signal is scaled so as to be representative of the position of said first control valve required to maintain the actual flow rate of said effluent stream substantially equal to the desired flow rate represented by said ninth signal; and manipulating said first control valve in response to said nineteenth signal.

* * * * *